(12) United States Patent
Park et al.

(10) Patent No.: US 12,202,005 B2
(45) Date of Patent: Jan. 21, 2025

(54) SLOT DIE COATING APPARATUS

(71) Applicant: LG Energy Solution, Ltd., Seoul (KR)

(72) Inventors: Chan Woo Park, Daejeon (KR); Kwan Hong Bae, Daejeon (KR); Yong Tae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/626,718

(22) PCT Filed: Mar. 18, 2021

(86) PCT No.: PCT/KR2021/003343
§ 371 (c)(1),
(2) Date: Jan. 12, 2022

(87) PCT Pub. No.: WO2021/187908
PCT Pub. Date: Sep. 23, 2021

(65) Prior Publication Data
US 2022/0241813 A1    Aug. 4, 2022

(30) Foreign Application Priority Data

Mar. 19, 2020 (KR) ............... 10-2020-0034016
Mar. 17, 2021 (KR) ............... 10-2021-0034347

(51) Int. Cl.
*B05C 5/02*    (2006.01)

(52) U.S. Cl.
CPC .................. *B05C 5/0258* (2013.01)

(58) Field of Classification Search
CPC ... B05C 5/0254–0266; H01L 21/67253; G01F 1/56–668; B05B 1/04–086; B05B 7/025
See application file for complete search history.

(56) References Cited

U.S. PATENT DOCUMENTS 3,952,577 A * 4/1976 Hayes ................ G01F 1/36
73/54.04
4,170,133 A * 10/1979 Gardner ............... G01F 1/58
73/861.16

(Continued)

FOREIGN PATENT DOCUMENTS

CN    106605320 A    4/2017
JP    H06226181 A    8/1994

(Continued)

OTHER PUBLICATIONS

Extended European Search Report for Application No. 21770473.3 dated Oct. 5, 2022, pp. 1-5.

(Continued)

*Primary Examiner* — Dah-Wei D. Yuan
*Assistant Examiner* — Stephen A Kitt
(74) *Attorney, Agent, or Firm* — Lerner David LLP (57) ABSTRACT

A slot die coating apparatus according to one embodiment of the present disclosure includes: a slot die containing a first die block and a second die block, and a sensor unit for measuring the flow rate of an electrode active material slurry which is discharged through a discharge port formed by the coupling of the first die block and the second die block, wherein the sensor unit is formed inside the first die block, and the sensor unit is connected to the discharge port via an energy dissipation part and an energy absorption part.

6 Claims, 5 Drawing Sheets

(56) References Cited

U.S. PATENT DOCUMENTS

| | | | | |
|---|---|---|---|---|
| 4,982,687 | A | * | 1/1991 | Takahashi ........... B05C 11/1039 |
| | | | | 118/410 |
| 6,139,637 | A | * | 10/2000 | Takahashi ............ B05C 5/0262 |
| | | | | 118/712 |
| 7,143,637 | B1 | * | 12/2006 | McBrearty ........... G01N 27/221 |
| | | | | 73/54.14 |
| 2003/0175430 | A1 | * | 9/2003 | Tomaru ................... B05C 11/04 |
| | | | | 118/123 |
| 2005/0181245 | A1 | | 8/2005 | Bonne et al. |
| 2006/0169205 | A1 | * | 8/2006 | Liu ....................... B05C 5/0275 |
| | | | | 118/410 |
| 2007/0251450 | A1 | | 11/2007 | Lin |
| 2013/0263675 | A1 | * | 10/2013 | Isicovich ................ G01F 1/588 |
| | | | | 73/861.11 |
| 2014/0004264 | A1 | | 1/2014 | Duerig et al. |
| 2015/0144059 | A1 | | 5/2015 | Duerig et al. |
| 2015/0165472 | A1 | | 6/2015 | Komatsubara et al. |
| 2016/0168681 | A1 | | 6/2016 | Duerig et al. |
| 2019/0285445 | A1 | * | 9/2019 | Momose ................... G01F 1/60 |

FOREIGN PATENT DOCUMENTS

| | | | |
|---|---|---|---|
| JP | H09299862 | A | 11/1997 |
| JP | 2001018212 | A * | 1/2001 |
| JP | 2005144373 | A | 6/2005 |
| JP | 2005152821 | A | 6/2005 |
| JP | 2010205679 | A | 9/2010 |
| JP | 2012061444 | A | 3/2012 |
| JP | 2013140680 | A | 7/2013 |
| JP | 2013215644 | A | 10/2013 |
| JP | 2014147857 | A | 8/2014 |
| JP | 2014160564 | A | 9/2014 |
| JP | 2015153527 | A | 8/2015 |
| JP | 2015176822 | A | 10/2015 |
| JP | 2016033884 | A | 3/2016 |
| JP | 2016059907 | A | 4/2016 |
| JP | 6425776 | B1 | 11/2018 |
| KR | 20120047426 | A | 5/2012 |
| KR | 20150011378 | A | 1/2015 |
| KR | 20170034222 | A | 3/2017 |
| KR | 101740778 | B1 | 6/2017 |
| KR | 20190030284 | A | 3/2019 |
| WO | 2015053158 | A1 | 4/2015 |
| WO | 2015141391 | A1 | 9/2015 |

OTHER PUBLICATIONS

Search Report dated Aug. 1, 2022 from the Office Action for Chinese Application No. 202180003993.6 issued Aug. 8, 2022, pp. 1-3.

Search Report dated Mar. 7, 2023 from the Office Action for Chinese Application No. 202180003993.6 issued Mar. 9, 2023, 3 pages. [See p. 1-2, categorizing the cited references].

International Search Report for PCT/KR2021/003343 dated Jul. 8, 2021. 3 pgs.

Yonghong, C. "Power Equipment Measurement—Sensing and Measurement." Control Technology, China Electric Power Press, Apr. 2003, pp. 1-10. (Concise Explanation of Relevance is attached).

Office Action dated Jul. 13, 23 from the Office Action for Chinese Application No. 202180003993.6, pp. 1-5. [See pp. 3-5, categorizing the cited references].

Search Report dated Nov. 6, 2023 from the Office Action for Chinese Application No. 202180003993.6 issued Nov. 14, 2023, 3 pages. [See p. 1-2, categorizing the cited references].

* cited by examiner

SLOT DIE COATING APPARATUS

CROSS-REFERENCE TO RELATED APPLICATIONS

This application is a national phase entry under 35 U.S.C. § 371 of International Application No. PCT/KR2021/003343, filed on Mar. 18, 2021, which claims priority to Korean Patent Application No. 10-2020-0034016, filed on Mar. 19, 2020, and Korean Patent Application No. 10-2021-0034347, filed on Mar. 17, 2021, the disclosures of which are incorporated herein by reference in their entirety.

TECHNICAL FIELD

The present disclosure relates to a slot die coating apparatus, and more particularly, to a slot die coating apparatus for improving coating uniformity.

BACKGROUND ART

With the increase of the technological development and demand for a mobile device, demand for a secondary battery as an energy source is rapidly increasing, and accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Meanwhile, the process of producing a secondary battery may include a step in which a positive electrode conductive current collector and a negative electrode conductive current collector are each coated with an active material, a binder, a conductive material and the like to a predetermined thickness in the form of a slurry, and then dried. Then, an electrode assembly formed by winding or stacking the two current collectors with a separator interposed therebetween is accommodated in a cylindrical or prismatic can, pouch, or the like, and sealed to produce a secondary battery.

In order to uniformize the charging/discharging characteristics of the secondary battery, the slurry containing such an active material should be uniformly coated onto the current collector. For this purpose, a slot die coating process can be performed. The slot die coating is a method in which a slurry is supplied between thin metal plates in the shape of a nozzle called a slot die using a pump, and coated onto the surface of the current collector to a certain thickness. At this time, in order to achieve a uniform coating, it is important to control the viscosity of the slurry, the flow of slurry, and the distance between the slot die and the current collector.

However, as an electrode whose width gradually becomes wide is coated, the flow rate of the slurry exiting the slot die may cause large deviation depending on the shape of the slot die and its position in the slot die. In addition, it is difficult to measure the flow rate flowing out through the slot die, and once the shape and thickness of the thin metal plate of the slot die are determined, the shape and thickness of the slot die cannot be changed in real time during coating, which causes a problem that the flow rate of the slurry cannot be controlled. Accordingly, an imbalance in the electrode coating will occur.

DETAILED DESCRIPTION OF THE INVENTION

Technical Problem

It is an object of the present disclosure to provide a slot die coating apparatus for improving coating uniformity.

However, the problem to be solved by the embodiments of the present disclosure is not limited to the above-described problems, and can be variously expanded within the scope of the technical idea included in the present disclosure.

Technical Solution

According to one embodiment of the present disclosure, there is provided a slot die coating apparatus comprising: a slot die containing a first die block and a second die block, and a sensor unit for measuring the flow rate of an electrode active material slurry which is discharged through a discharge port formed by the coupling of the first die block and the second die block, wherein the sensor unit is formed inside the first die block, and the sensor unit is connected to the discharge port via an energy dissipation part and an energy absorption part.

The energy dissipation part and the energy absorption part may be formed of a transparent material.

The sensor unit may detect infrared energy or magnetic force energy of the electrode active material slurry and measure the flow rate of the electrode active material slurry.

The energy dissipation part and the energy absorption part may be located apart from each other along the discharge direction of the discharge port.

The energy dissipation part and the energy absorption part may be respectively formed in a plural number along a direction perpendicular to the discharge direction of the discharge port, the plurality of the energy dissipation parts formed may be located apart from each other, and the plurality of the energy absorption parts may be located apart from each other.

A manifold may be formed on the second die block, and a slurry supply part and a slurry recovery part may be formed in the manifold.

The slot die coating apparatus may further include a control unit for adjusting the flow rate of the electrode active material slurry in response to a signal detected by the sensor unit.

The control unit may include a flow rate control pump located between the slurry recovery part and the slurry supply part.

The slurry recovery part and the slurry supply part are in fluid communication with the flow rate control pump, and the electrode active material slurry recovered by the slurry recovery part may pass through the flow rate control pump and may be supplied to the manifold via the slurry supply part.

The slurry recovery part is located ahead of the discharge port along the discharge direction of the electrode active material slurry to recover the electrode active material slurry and reduce the supply flow rate of the slurry, and the slurry supply part re-supplies the recovered electrode active material slurry to the manifold to increase the supply flow rate of the slurry.

Advantageous Effects

According to embodiments of the present disclosure, a precision flow meter is installed at the outlet of the slot die from which the slurry exits, thereby capable of measuring the slurry flow rate for each position.

In order to uniformly adjust the detected slurry flow rate for each position in real time, a pump is installed, whereby a slurry is circulated in a manifold, which is a space in which the slurry is stored inside the slot die, thereby capable of adjusting the pressure.

DETAILED DESCRIPTION OF THE EMBODIMENTS

Hereinafter, various embodiments of the present disclosure will be described in detail with reference to the accompanying drawings so that those skilled in the art can easily implement them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

Further, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 1:
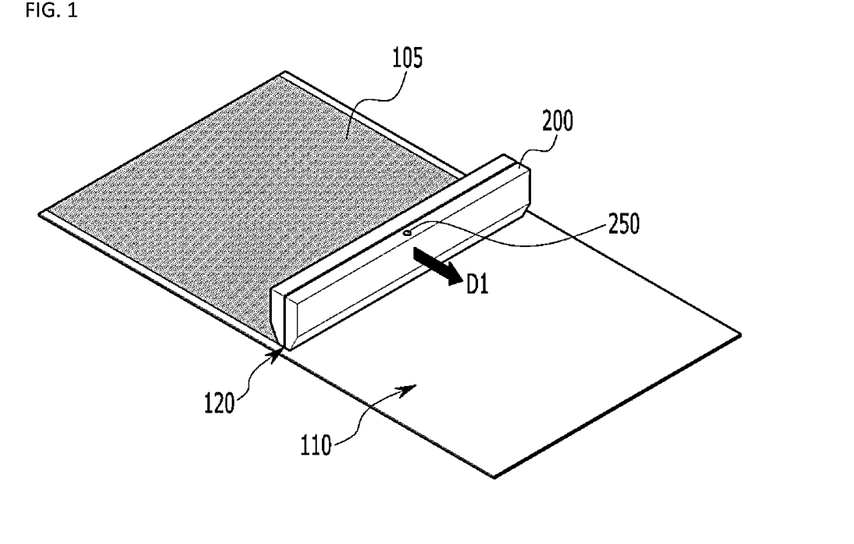
FIG. 1 is a diagram schematically showing a process of slurry coating using a slot die coating apparatus according to an embodiment of the present disclosure.

FIG. 1 is a diagram schematically showing a process of slurry coating using a slot die coating apparatus according to an embodiment of the present disclosure.

Referring to FIG. 1, the slot die coating apparatus 200 according to the embodiment of the present disclosure can coat the electrode active material slurry 105 onto the electrode current collector 110 while moving in one direction D1. The electrode active material slurry 105 is a mixture prepared in a low fluidity state by mixing fine solid particles in a liquid, and an electrode slurry prepared by mixing a binder with a solvent in a certain ratio can be coated as a thin film onto the electrode current collector 110 and then subjected to drying and pressing process to produce an electrode for a secondary battery. The electrode slurry includes an active material, a binder, a conductive material, and the like, and the active material may be a positive electrode active material or a negative electrode active material.

The discharge port 120 of the slot die coating apparatus 200 may be disposed toward the electrode current collector 110 in a direction perpendicular to the upper surface of the electrode current collector 110. The slurry injected into the slot die coating apparatus 200 via a slurry feeding port 250 can be discharged via the discharge port 120. Generally, in order to control the flow rate of the slurry coming out of the discharge port 120 of the slot die coating apparatus 200, it is possible to change the design of the internal structure of the manifold of the slot die coating apparatus 200, or adjust a distance between the die block of the slot die coating apparatus 200 and the electrode current collector 110. According to the embodiment of the present disclosure, the flow rate can be controlled more precisely by the improved slot die coating apparatus in order to minimize the flow rate deviation, without simply changing the design of the internal structure of the manifold or adjusting the slurry discharge interval, or the like. Specifically, according to the existing flow control method, when a slight difference occurred in the flow rate of the slurry in the full width direction at the discharge die, it can be seen only by checking the coated electrode, whereas according to the embodiment of the present disclosure, a flow meter can be installed for each section in the full width direction, thereby detecting the difference in flow rate and adjusting the flow rate uniformly.

More detailed descriptions will be given below.

Figure 2:
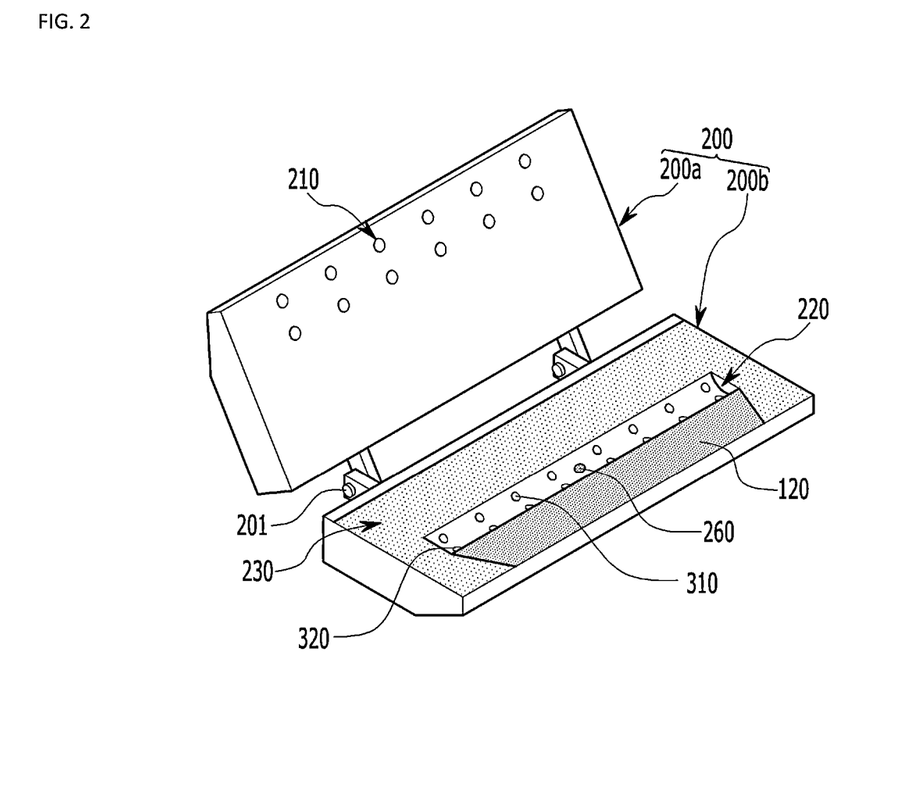
FIG. 2 is a diagram showing a slot die coating apparatus according to an embodiment of the present disclosure.

FIG. 2 is a diagram showing a slot die coating apparatus according to an embodiment of the present disclosure.

Referring to FIG. 2, the slot die coating apparatus 200 according to the embodiment of the present disclosure includes a first die block 200a and a second die block 200b. The first die block 200a and the second die block 200b can be connected by a coupling part 201, and the coupling part 201 can be rotated by a hinge so that the first die block 200a and the second die block 200b come into contact with each other. A plate material 230 (shim) may be disposed on the first die block 200a and the second die block 200b, and the plate material may be a thin metal plate.

The slot die coating apparatus 200 according to the embodiment of the present disclosure includes a sensor unit for measuring the flow rate of the electrode active material slurry which is discharged via the discharge port 120 formed by the coupling of the first die block 200a and the second die block 200b, and a control unit for adjusting the flow rate of the electrode active material slurry in response to the signal detected by the sensor unit. The sensor unit may be a non-contact flow meter, and as an example, it may be an energy detection sensor 210. A slurry supply part 310 and a slurry recovery part 320 may be formed in the manifold 220 formed in the second die block 200b. The control unit may be a flow rate control pump described later, and the flow rate control pump may be located between the slurry recovery part 320 and the slurry supply part 310.

The manifold 220 is a space in which the slurry is stored in the slot die coating apparatus 200, which is an internal space of the mechanism for allowing the slurry to come out at a uniform flow rate. A slurry inlet 260 connected to the slurry feeding port 250 of FIG. 1 may be formed in the manifold 220.

Figure 3:
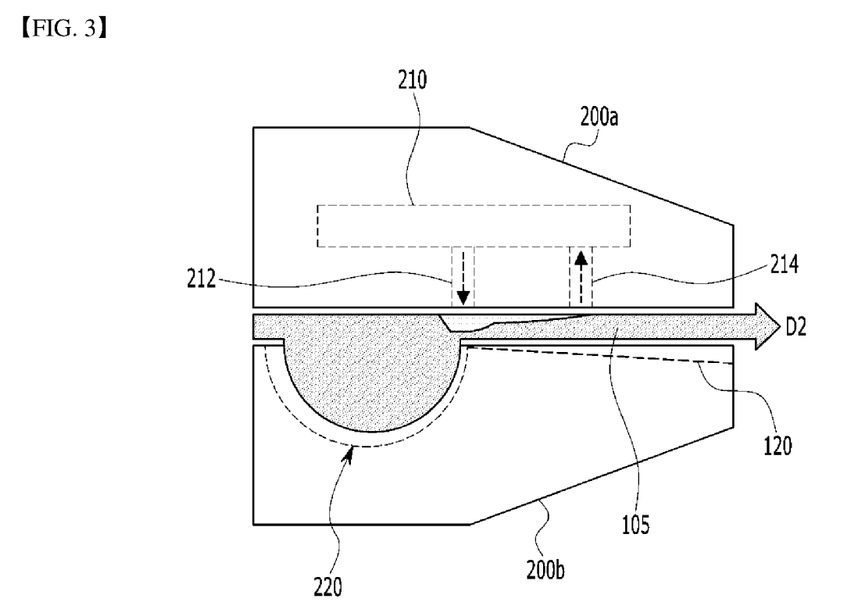
FIG. 3 is a diagram showing the structure of a non-contact flow meter included in the slot die coating apparatus of FIG. 2.

FIG. 3 is a diagram showing the structure of a non-contact flow meter included in the slot die coating apparatus of FIG. 2.

Referring to FIG. 3, the non-contact flow meter according to the embodiment of the present disclosure is a sensor unit that measures the flow rate of the electrode active material slurry discharged through the discharge port 120. The non-contact flow meter may be an energy detection sensor 210. The energy detection sensor 210 may be formed inside the first die block 200a and may be connected to the discharge port 120 through the energy dissipation part 212 and the energy absorption part 214. The energy dissipation part 212 and the energy absorption part 214 may be located apart from each other along the discharge direction of the discharge port 120. The sensor unit should be able to check the flowing amount of slurry. However, if the sensor unit is configured in a contact type, the sensor unit obstructs the flowing of the slurry and thus, the flow rate of the slurry cannot be accurately measured. Therefore, the energy dissipation part 212 and the energy absorption part 214 according to the embodiment of the present disclosure may be formed of a transparent material so that the slurry does not come into contact with the sensor unit. The transparent material may be an engineering plastic or glass material having excellent wear resistance.

The energy detection sensor 210 according to the embodiment of the present disclosure can detect infrared energy or magnetic force energy of the electrode active material slurry 105 and thus, measure the flow rate of the electrode active material slurry 105. Specifically, the energy generated by the energy detection sensor 210 is irradiated to the electrode active material slurry 105 through the energy dissipation part 212, and the energy signal of the irradiated electrode active material slurry 105 is received from the energy detection sensor 210 through the energy absorption part 214, whereby a flow rate that can be discharged to the discharge port 120 can be measured. For example, the energy dissipation part 212 applies a certain amount of heat to the slurry, and when the heated slurry passes through the energy absorption part 214, it can recognize a signal and measure the flow rate. The energy dissipation part 212 corresponds to the signal generating part of the energy detection sensor 210, and the energy absorption part 214 may correspond to the signal receiving part of the energy detection sensor 210.

Figure 4:
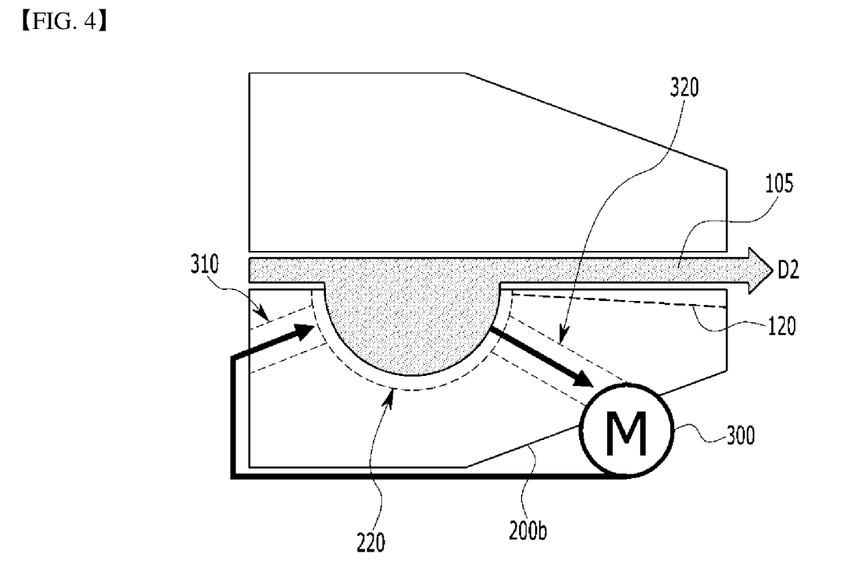
FIG. 4 is a diagram showing the structure of a flow rate control pump included in the slot die coating apparatus of FIG. 2.

FIG. 4 is a diagram showing the structure of a flow rate control pump included in the slot die coating apparatus of FIG. 2.

Referring to FIG. 4, a slurry supply part 310 and a slurry recovery part 320 are formed in the manifold 220 formed in the second die block 200b. The slurry supply part 310 and the slurry recovery part 320 can circulate the electrode active material slurry 105 in the manifold 220. According to the embodiment of the present disclosure, the flow rate control pump 300 is formed between the slurry supply part 310 and the slurry recovery part 320. The slurry recovery part 320 and the slurry supply part 310 are in fluid communication with the flow rate control pump 300, and the electrode active material slurry 105 recovered in the slurry recovery part 320 can pass through the flow rate control pump 300 and supplied to the manifold 220 via the slurry supply part 310.

Specifically, the slurry recovery part 320 is located ahead of the discharge port 120 along the discharge direction D2 of the electrode active material slurry 105 to recover the electrode active material slurry 105 and thus reduce the supply flow rate of the slurry. The slurry supply part 310 can re-supply the recovered electrode active material slurry 105 to the manifold 220 to increase the supply flow rate of the slurry.

Figure 5:
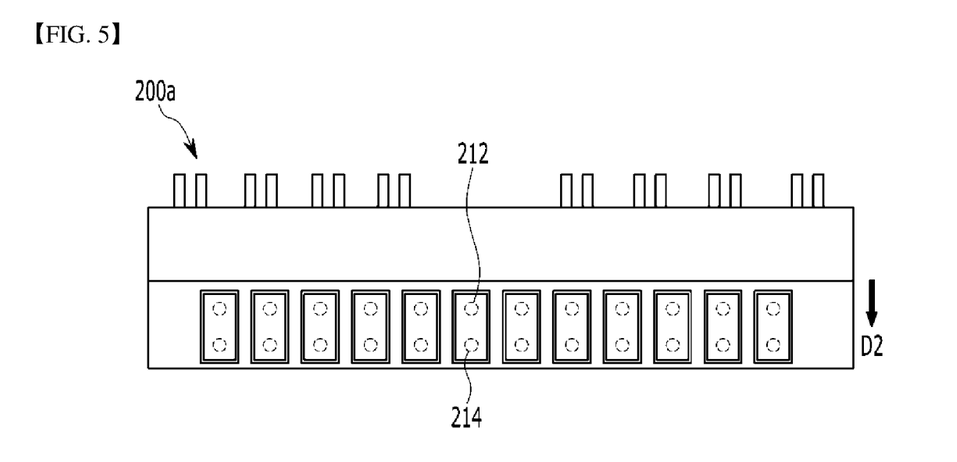
FIG. 5 is a diagram showing a first die block included in the slot die coating apparatus of FIG. 2.
Figure 6:
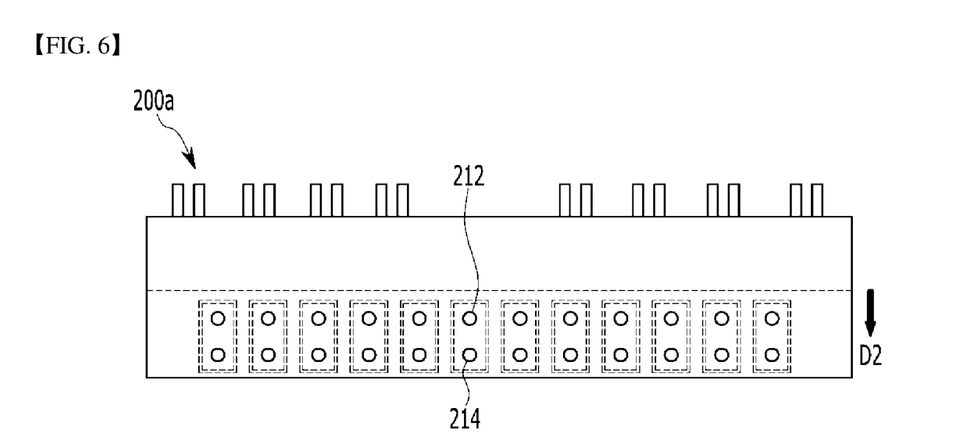
FIG. 6 is a diagram showing a first die block included in the slot die coating apparatus of FIG. 2.
Figure 7:
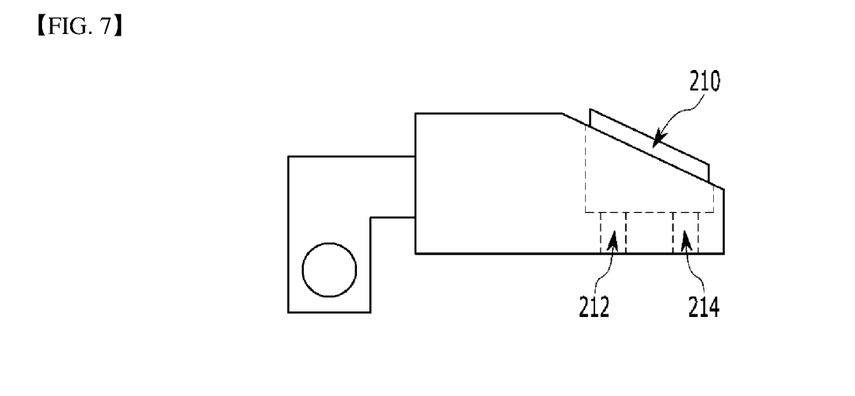
FIG. 7 is a diagram showing a first die block included in the slot die coating apparatus of FIG. 2.

FIG. 5 is a diagram showing a first die block included in the slot die coating apparatus of FIG. 2. FIG. 6 is a diagram showing a first die block included in the slot die coating apparatus of FIG. 2. FIG. 7 is a diagram showing a first die block included in the slot die coating apparatus of FIG. 2.

Referring to FIGS. 5 to 7, the energy dissipation part 212 and the energy absorption part 214 are formed in a plural number along a direction perpendicular to the discharge direction D2 of the discharge port, respectively, and the plurality of the formed energy dissipation parts 212 may be located apart from each other, and the plurality of the energy absorption parts 214 may be located apart from each other. As described above, the plurality of the energy dissipation parts 212 and the energy absorption parts 214 are disposed at regular intervals in the width direction of the first die block 200a, and the energy detection sensor 210 can be formed so as to correspond to the group including the energy dissipation part 212 and the energy absorption part 214, thereby capable of measuring the flow rate of the electrode active material slurry for each position.

Figure 8:
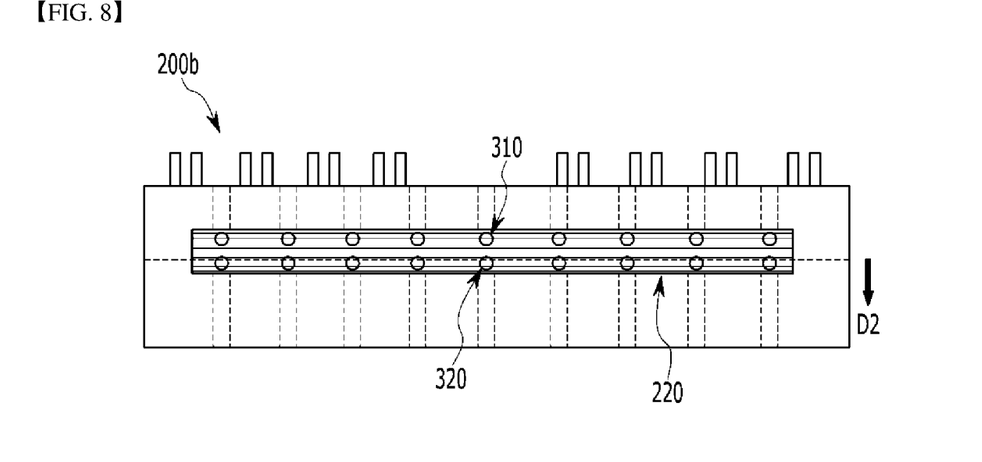
FIG. 8 is a diagram showing a second die block included in the slot die coating apparatus of FIG. 2.
Figure 9:
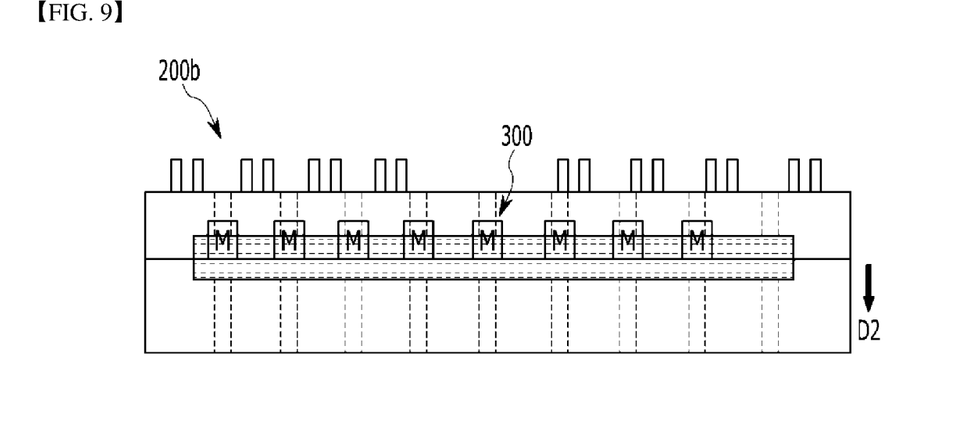
FIG. 9 is a diagram showing a second die block included in the slot die coating apparatus of FIG. 2.

FIG. 8 is a diagram showing a second die block included in the slot die coating apparatus of FIG. 2. FIG. 9 is a diagram showing a second die block included in the slot die coating apparatus of FIG. 2.5 FIG. 10 is a diagram showing a second die block included in the slot die coating apparatus of FIG. 2.

Figure 10:
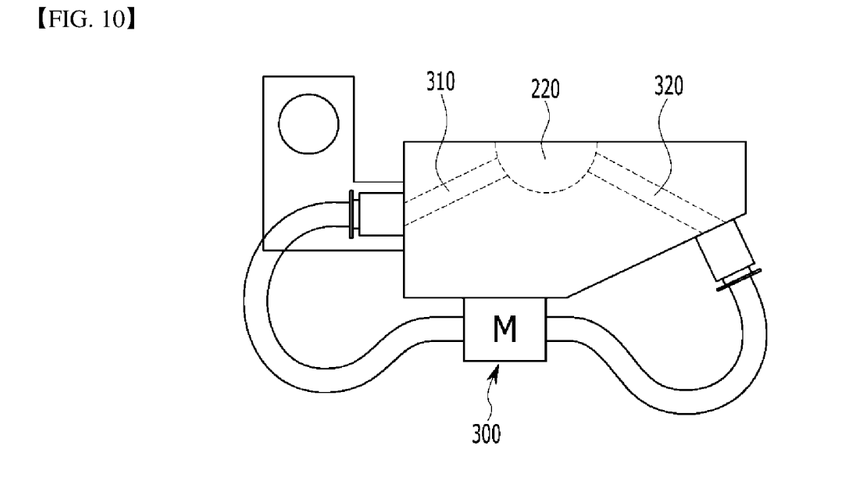
FIG. 10 is a diagram showing a second die block included in the slot die coating apparatus of FIG. 2.

Referring to FIGS. 8 to 10, the slurry supply part 310 and the slurry recovery part 320 are each formed in a plural number along a direction perpendicular to the discharge direction D2 of the discharge port, and the plurality of formed slurry supply parts 310 may be located apart from each other, and the plurality of formed slurry recovery parts 320 may be located apart from each other. In this way, the plurality of the slurry supply parts 310 and the slurry recovery part 320 are disposed at regular intervals in the width direction of the second die block 200b, and the flow rate control pump 300 can be formed so as to correspond to the group including the slurry supply part 310 and the slurry recovery part 320, thereby capable of controlling the flow rate of the electrode active material slurry for each position. The flow rate control pump 300 may control the pressure by circulating the electrode active material slurry in the manifold 220.

Although preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

105: electrode active material slurry
110: electrode current collector

120: discharge port
200: slot die coating apparatus
200a: first die block
200b: second die block
210: energy detection sensor
212: energy dissipation part
214: energy absorption part
220: manifold
300: flow rate control pump
310: slurry supply part
320: slurry recovery part

The invention claimed is:

1. A slot die coating apparatus comprising:
a slot die containing a first die block and a second die block;
a feeding port;
a non-contact flow meter configured to measure a flow rate of an electrode active material slurry which is discharged through a discharge port formed by a coupling of the first die block and the second die block; and
a control unit configured to adjust the flow rate of the electrode active material slurry in response to a signal detected by the non-contact flow meter using a flow rate control pump located between a slurry recovery part and a slurry supply part, wherein the flow rate control pump is contacting the slot die,
wherein the non-contact flow meter is formed inside the first die block, and the non-contact flow meter is connected to the discharge port via an energy dissipation part and an energy absorption part,
wherein the energy dissipation part and the energy absorption part are formed of a transparent material,
wherein the energy dissipation part and the energy absorption part are respectively formed in a plural number along a direction perpendicular to the discharge direction of the discharge port, the plurality of the energy dissipation parts formed are located apart from each other, and the plurality of the energy absorption parts are located apart from each other, and
wherein the flow rate control pump is not directly connected to the feeding port.

2. The slot die coating apparatus of claim 1, wherein the non-contact flow meter is configured to detect infrared energy or magnetic force energy of the electrode active material slurry and to measure the flow rate of the electrode active material slurry.

3. The slot die coating apparatus of claim 1, wherein the energy dissipation part and the energy absorption part are located apart from each other along a discharge direction of the discharge port.

4. The slot die coating apparatus of claim 1, wherein a manifold is formed on the second die block, and the slurry supply part and the slurry recovery part are formed in the manifold.

5. The slot die coating apparatus of claim 1, wherein a manifold is formed on the second die block, and the slurry supply part and the slurry recovery part are formed in the manifold, and
the slurry recovery part and the slurry supply part are in fluid communication with the flow rate control pump, and an electrode active material slurry recovered by the slurry recovery part passes through the flow rate control pump and is supplied to the manifold via the slurry supply part.

6. The slot die coating apparatus of claim 5, wherein the slurry recovery part is located ahead of the discharge port along the discharge direction of the electrode active material slurry to recover the electrode active material slurry and reduce a supply flow rate of the slurry, and the slurry supply part re-supplies the recovered electrode active material slurry to the manifold to increase the supply flow rate of the slurry.

* * * * *